Feb. 19, 1929.

J. A. DAVEY ET AL 1,702,337

TREATING TREES

Filed Dec. 21, 1926

INVENTOR

Feb. 19, 1929.　　　　　　　　　　　　　　　　　　　　　1,702,337
J. A. DAVEY ET AL
TREATING TREES
Filed Dec. 21, 1926　　　　4 Sheets-Sheet 3

INVENTOR
James H. Davey
Paul H. Davey
Charles L. Gaugler
by their atty.
Bfinns, Stebbins & Pommelee Feb. 19, 1929.

J. A. DAVEY ET AL

TREATING TREES

Filed Dec. 21, 1926 4 Sheets-Sheet 4

Patented Feb. 19, 1929.

1,702,337

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR TO THE DAVEY TREE EXPERT COMPANY, OF KENT, OHIO, A CORPORATION OF OHIO.

TREATING TREES.

Application filed December 21, 1926. Serial No. 156,108.

This invention relates to the treating of trees, and particularly to the cutting of cavities therein for filling. According to our invention, substantially all of the operations may be carried out by the use of automatic tools, thus doing away with the expensive hand labor that has been heretofore necessary.

The cutting of tree cavities presents a materially different problem from the cutting of recesses in dead wood. It is necessary, in order that the operation on the tree shall be successful, to leave the bark surrounding the cavity in such condition that it tends to grow over the cementitious material with which the cavity is filled. The operations must be carried out in such manner that the bark does not separate from the body of the tree at the cambium layer, for if this is done, the cavity is slow to heal, or in some cases may never heal.

Heretofore, tree surgery has been largely a matter of hand work. The excavation of the cavities has been accomplished by hand chisels, gouges and the like. This work has taken considerable time, and required highly skilled workmen, and in many cases has not been entirely satisfactory because the continual hammering of the gouges or chisels tends to cause separation of the bark from the tree.

We provide hand guided tools operated at high speed from a suitable source of power and effective for taking a rapid succession of light cuts. Compressed air is preferably employed as a source of power, as the compressor unit may be placed on a truck and driven to a point adjacent the work.

The use of compressed air gives the desired flexibility and convenience in operation, and at the same time provides a ready means for the disposal of the chips which are formed in the tree cavity during cutting. With certain of the tools employed, the exhaust air may be employed to blow the chips out of the cavity and thus facilitate the work.

We preferably use a high speed cutting saw for outlining the cavity which is to be excavated. This saw is run at a sufficient speed to insure that the bark will not become separated from the tree body, and a cut is made through the bark and into the cambium layer. The saw is guided so as to outline in the bark the shape of the cavity which is to be cut, and the bark within the outline may then be stripped from the tree.

Preferably the next step in the operation consists in removing a large amount of the wood within the outlined area by drilling holes to substantially the depth of the finished cavity. When the wood is thus honeycombed with holes, the remaining wood may be removed by a succession of light cuts without danger of the bark adjoining the cavity being separated from the tree.

A reciprocating cutting tool is preferably employed for working out the honeycombed wood and the interior of the cavity is then smoothed by a high speed rotary planer. If the cavity is of sufficient size, it is braced, as by using screw threaded bars, hereinafter described, and the cavity is then disinfected, waterproofed and filled in accordance with the usual practice.

In the accompanying drawings.

Figure 10:
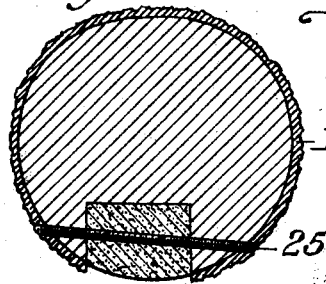
Figure 9:
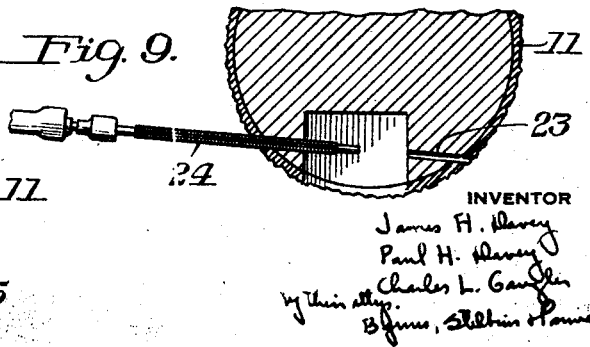
Figure 11:
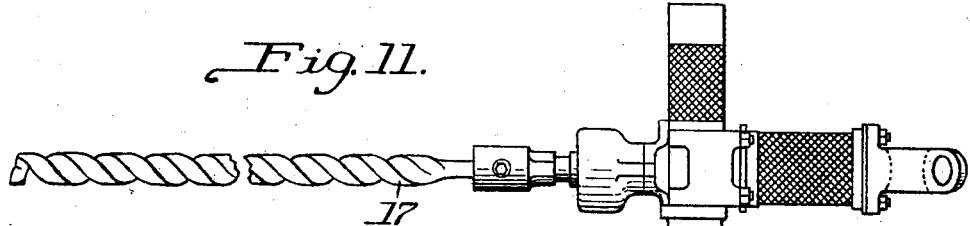
Figure 12:
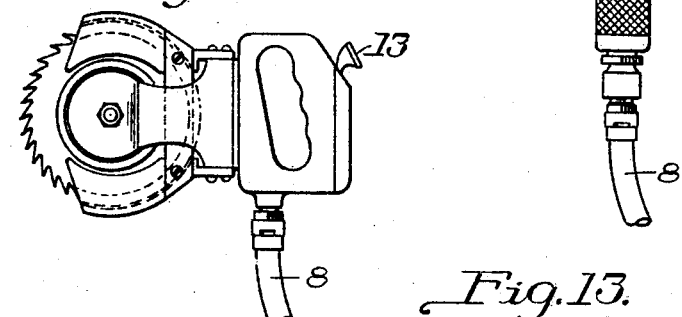
Figure 13:
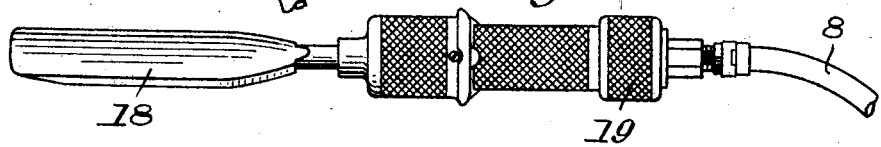
Figure 14:
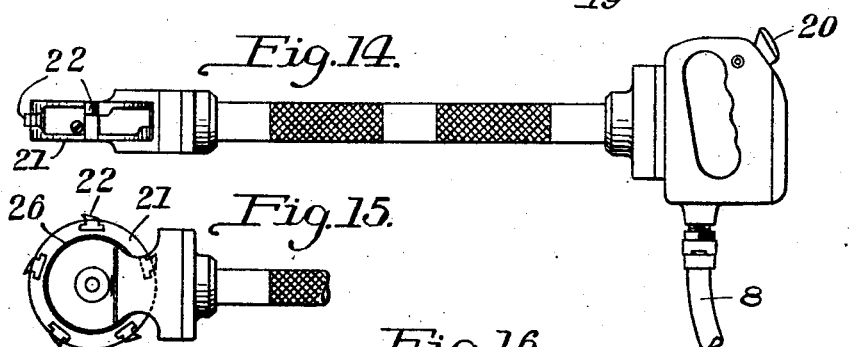
Figure 15:
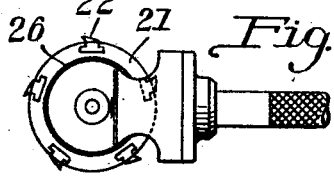

Figures 3 to 8 inclusive are side elevations of a portion of the tree trunk showing the successive steps in the preparation and filling of a cavity;

Figure 9 is a horizontal section taken through a cavity showing the manner of preparing it for a brace rod;

Figure 10 is a view similar to Figure 9, but showing the brace rod in place and the cavity filled;

Figure 11 is a side elevation of the boring tool employed;

Figure 12 is a similar view showing the cutting saw;

Figure 13 is a side view of the pneumatic tool employed for cutting out the honeycombed wood;

Figure 14 is a side elevation of the rotary planer;

Figure 15 is another view showing the head of the planer of Figure 14; and

Figure 16:
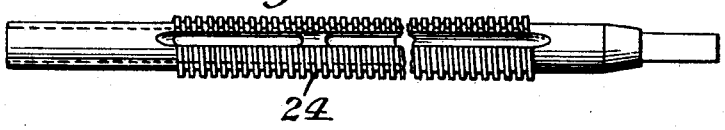

Figure 16 is a side elevation of one of the taps employed for installing the bracing rods.

Figure 1:
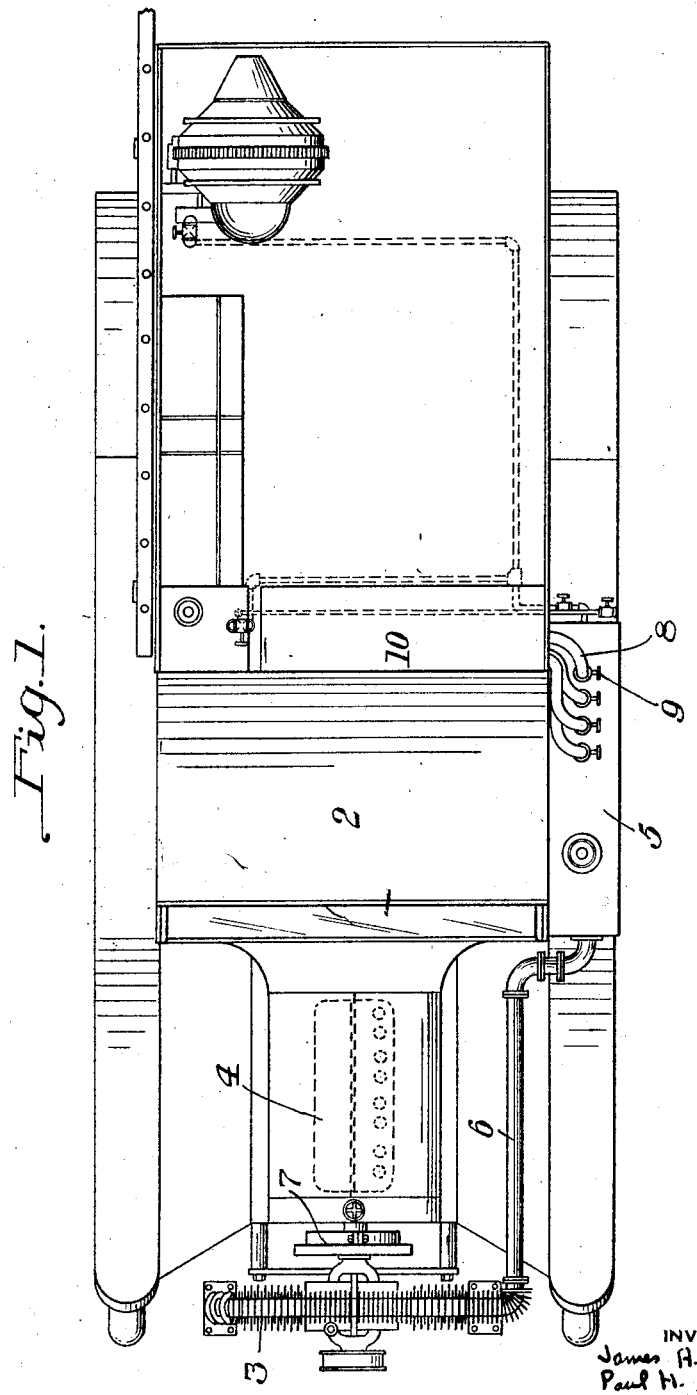
Figure 1 is a top plan view of a truck, showing a compressor for supplying the air to the tools.

Referring first to Figure 1, there is shown a motor truck 2 having an air compressor 3 thereon and adapted to be driven by the engine 4. The compressor is shown in detail in our copending application No. 703,098, filed March 31st, 1924, now Patent 1,685,150. It is connected to a reservoir 5 by an air pipe 6. When the apparatus is in use the truck is driven alongside the tree or trees to be treated, the gear shift is placed in the neutral position and the compressor is connected to the engine by a coupling 7.

The compressed air which is delivered to the tank 5 may be taken off through flexible conduits 8, each controlled by a valve 9 and leading to one of the tools herein illustrated. In Figure 1 the flexible conduits are shown as stored in a locker 10.

Figure 2:
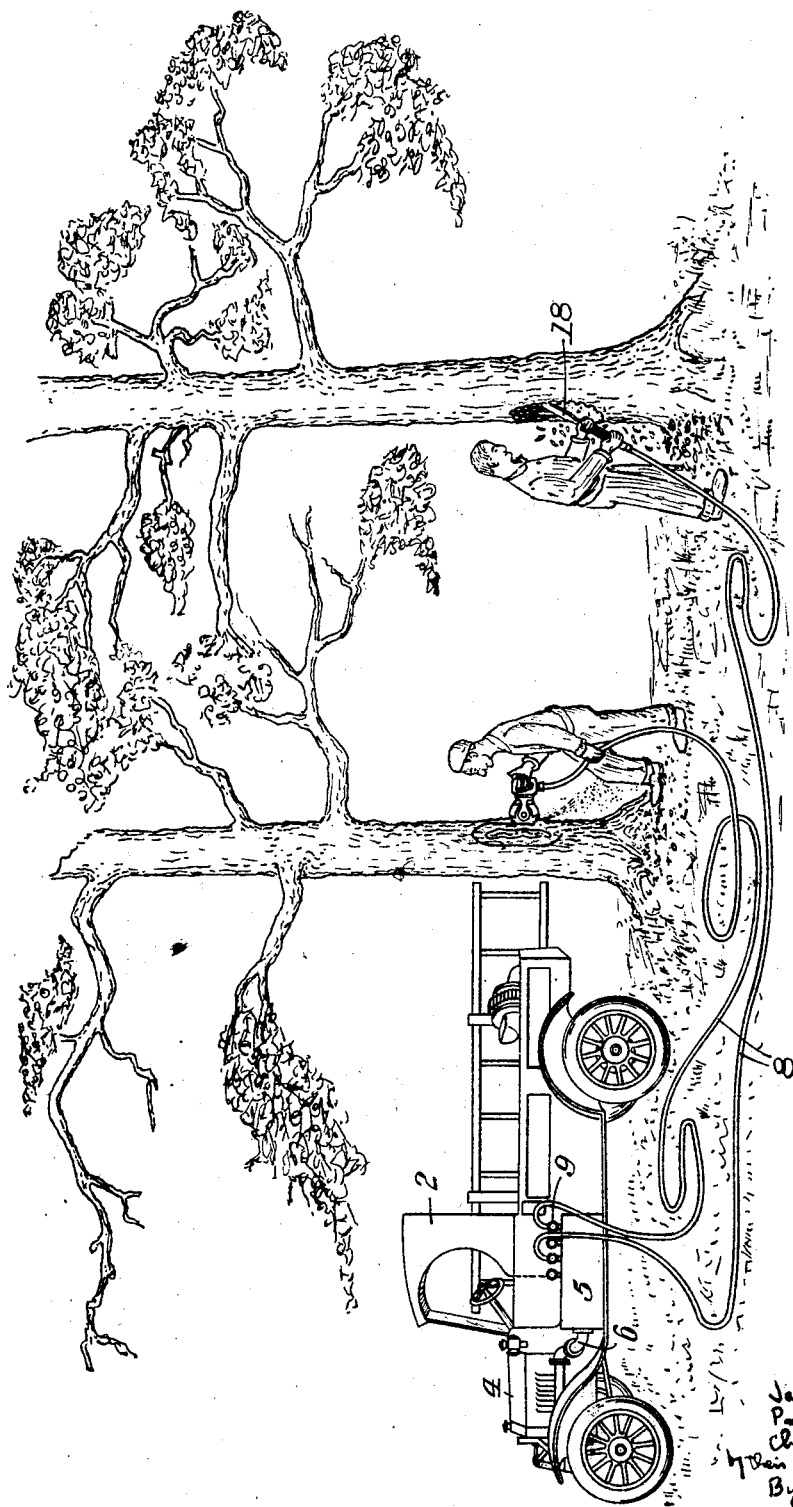
Figure 2 is a view showing generally the preferred manner of carrying out the invention, and illustrating two of the steps in preparing a cavity.
Figure 3:
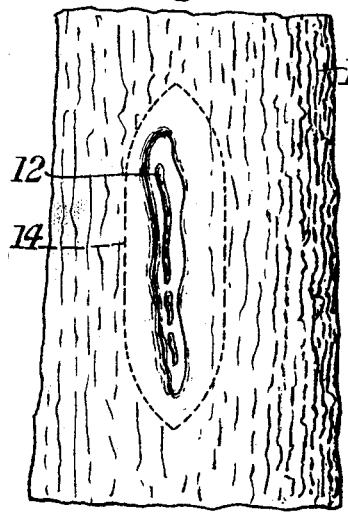
Figure 4:
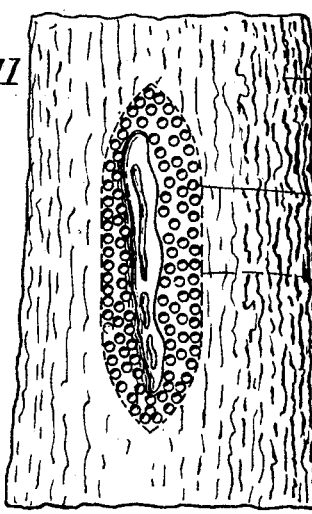
Figure 5:
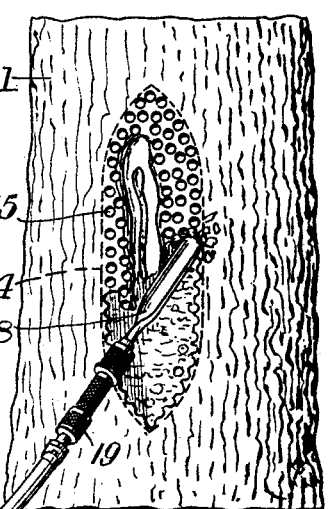
Figure 6:
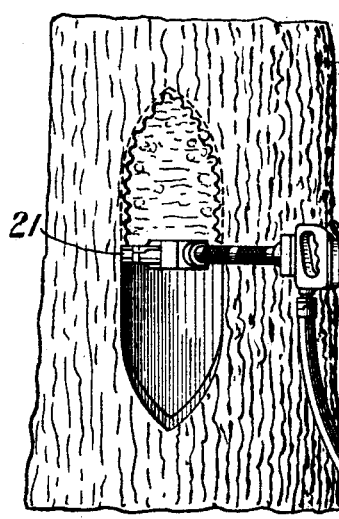

Referring to Figures 2 to 10 inclusive, there is shown in Figure 3 a tree trunk 11, having a decayed portion 12 therein. Immediately surrounding the cavity there will be a certain amount of decayed wood which must be removed in order to make a sound filling. The cavity will generally be of sufficient size to include the entire decayed portion 12, as well as sufficient sound wood therearound to make sure that all decay will be removed.

The first step in the operation is the outlining of the tree cavity. This is done by the rotary saw illustrated in Figure 12 which may be the same as our co-pending application 655,264, August 2, 1923, now Patent 1,682,268. Air is supplied through a conduit 8 and is controlled at the tool by a thumb lever 13. The saw is guided by hand and is driven at such a very high speed as to give a gyrostatic action to the saw tending to maintain it in its plane of rotation. High speed is important not only because it makes the saw easier to guide, but also because it insures that the bark will not become separated from the tree body. Obviously the holes, openings or recesses can be made in other ways. The saw employed runs at a speed of 20,000 to 30,000 R. P. M. when it is not cutting, but of course slows down to some extent in actual use. A saw of suitable size for this work, say six inches diameter, should be operated at a speed of at least 6000 R. P. M. in order to insure that the bark will not become separated from the tree.

In Figure 3 the outline of the cavity is illustrated at 14, and in Figure 2 the outlining step is shown. As the next step in the preparation of the cavity it is preferred to strip the bark within the outline 14. The saw cut is made of sufficient depth to extend through the bark and into the cambium layer, and the bark within the outline 14 may therefore be readily removed without danger of turning or lifting the surrounding bark.

After the bark is removed, the bare wood within the outline is bored full of holes 15. For this operation a rotary drill, such as shown in Figure 11, is employed. Air is supplied through a conduit 8 and is controlled at the tool by twisting the valve handle 16. An auger 17 is employed for boring the holes. It is preferably run into the wood to a depth corresponding substantially to the depth of the finished cavity.

After the boring operation has been completed, the wood within the outline of the cavity is so honeycombed that it is possible to remove the remaining wood without any danger of the surrounding bark being loosened from the tree. We preferably employ a reciprocating chipping tool for removing the honeycombed wood. Such a tool is shown in Figure 13. It is supplied with air from a conduit 8 and carries a gouge 18. The operation of the gouge is shown more or less diagrammatically in Figure 5. The supply of air to the tool of Figure 13 is controlled at the tool by means of a handle portion 18. This handle portion is ordinarily urged rearwardly by a spring within the handle and when in its rearward position, is effective for shutting off the air. Whenever the workman presses the gouge against the work, he necessarily slides the handle portion 19 forward and thus turns on the air.

The reciprocating chipping tool is very desirable because the honeycombed wood may be removed very rapidly. However, it is desirable to smooth the interior walls of the cavity and this is done by the rotary planer shown in Figures 14 and 15. The planer is supplied with air from a conduit 8 and the air is controlled at the tool by a thumb lever 20. The tool is provided with a turbine rotor 21 having cutting blades 22 on the periphery thereof. This tool, like the saw and the reciprocating gouge, preferably operates at high speeds and effects a rapid series of light cuts. The planer smoothes up the cavity in a short time, but without any danger to the bark surrounding the cavity. The planer may be such as in Patent No. 1,646,813, the blades having both peripheral and lateral cutting edges and the planer being driven at such a speed as to have a gyrostatic action.

Figure 7:
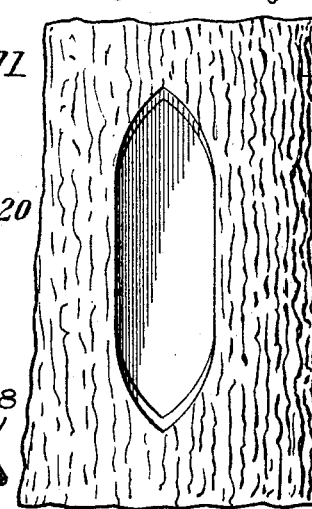
Figure 8:
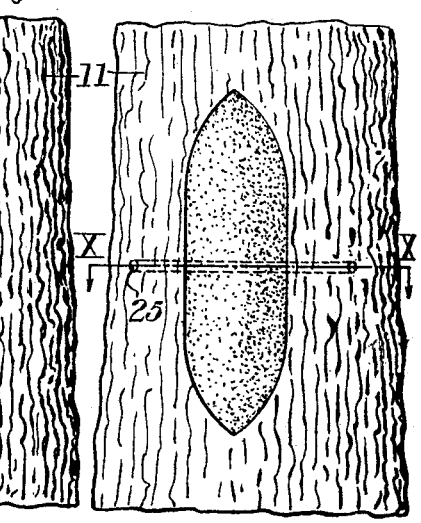

When the cavity has been completely worked out it is as shown in Figure 7. Sometimes it is desirable to provide a cross brace within the cavity. If this is the case, holes 23 are drilled transversely of the cavity, as shown in Figure 9. This may be readily done by the tool shown in Figure 11. A tap 24 is then placed in the tool of Figure 11 and is directed through the hole 23. This taps a thread in the wood and a threaded tie-rod 25 is put in place. The interior of the cavity is then prepared for filling in the usual manner by water proofing and the like.

Each of the operations is carried out with the tool running at such speed that no danger is done to the bark surrounding the cavity. It is found in actual operation that the time of preparing a cavity is only a fraction of that required by the use of the old hand methods, and the cavity produced is more satisfactory because it is very smooth, and the bark is not lifted from the tree adjacent the cavity.

Since the cutting is done by a rapid succession of light cuts, the dead wood may be cut out and the trimming done in live wood without breaking or gouging of the tools. It will be understood that the final cutting operations are always carried out in live wood.

The cutting saw of Figure 12 is described and claimed in our Patent 1,682,268, while the turbine tool illustrated in Figures 14 and 15 is described in our copending application No. 655,265, filed August 2nd, 1923, now Patent 1,646,812. This latter tool is particularly useful in shaping up cavities as the exhaust air escapes through an annular space 26, and is effective for blowing chips out of the cavity.

We have illustrated and described the preferred manner of carrying out the invention, but it will be understood that it is not thus limited, as it may be otherwise practiced within the scope of the following claims.

We claim:—

1. In the method of preparing cavities in trees, the steps consisting in cutting through the bark with a high speed implement so as to outline the cavity, stripping the bark from the outlined area, boring holes in the tree within the limits of such outline so as to honeycomb the wood, and then by a high speed implement roughing out the wood adjacent the holes by a rapid succession of light cuts.

2. In the art of tree surgery, the method of lining out a proposed cavity by an implement run at such a speed as to prevent injury to the live layers surrounding the proposed cavity.

3. In the art of tree surgery, a method comprising lining out a proposed cavity by an implement run at such a speed as to prevent injury to the live layers surrounding the proposed cavity, honeycombing the wood within the proposed cavity, removing such wood, and smoothing the walls of the cavity by a rapid succession of light cuts produced by a high speed implement.

4. The art of tree surgery comprising honeycombing the wood within the proposed cavity in a manner to avoid injury to the cambium layer surrounding said cavity, and then breaking out said honeycombed wood.

In testimony whereof we have hereunto set our hands.

JAMES A. DAVEY.
PAUL H. DAVEY.
CHARLES L. GAUGLER.